US012806109B2

(12) United States Patent
Han et al.

(10) Patent No.: US 12,806,109 B2
(45) Date of Patent: Nov. 24, 2026

(54) WALKING ASSISTANCE CONTROL SYSTEM AND METHOD

(71) Applicants: Hyundai Motor Company, Seoul (KR); Kia Corporation, Seoul (KR)

(72) Inventors: Ji Min Han, Anyang-si (KR); Jong Kyu Choi, Yongin-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 830 days.

(21) Appl. No.: 17/988,999

(22) Filed: Nov. 17, 2022

(65) Prior Publication Data

US 2023/0346629 A1 Nov. 2, 2023

(30) Foreign Application Priority Data

May 2, 2022 (KR) ........................ 10-2022-0054403

(51) Int. Cl.
*A61H 3/00* (2006.01)
*G01C 21/34* (2006.01)

(52) U.S. Cl.
CPC ........... *A61H 3/00* (2013.01); *G01C 21/3469* (2013.01); *A61H 2003/007* (2013.01); *A61H 2201/165* (2013.01); *A61H 2201/5012* (2013.01); *A61H 2201/5058* (2013.01); *A61H 2201/5097* (2013.01)

(58) Field of Classification Search
CPC ................ A61H 3/00; A61H 2003/007; A61H 2201/165; A61H 2201/5012; A61H 2201/5058; A61H 2201/5097; A61H 3/04; A61H 1/0262; A61H 2003/043; A61H 2201/5007; A61H 2201/501; G01C 21/3469; G01C 21/20; B60L 58/12; B60L 2240/54; B60L 2240/64; B60L 58/10–14; B60L 58/18; B60L 2200/24; B60L 2240/10; B60L 2240/16; B60W 10/26;
(Continued)

(56) References Cited

U.S. PATENT DOCUMENTS 10,295,355 B2 * 5/2019 Baglino ............. G01C 21/3697
10,406,058 B2 9/2019 Kim et al.
(Continued)

FOREIGN PATENT DOCUMENTS

DE 102016215400 A1 * 2/2018 ............... A61H 3/00
JP 2007139710 A 6/2007
(Continued)

OTHER PUBLICATIONS

DE102016215400_machine_translation_accessed_6_16_2026 (Year: 2026).*

*Primary Examiner* — Victoria Murphy
*Assistant Examiner* — Kris Hanyu Gong
(74) *Attorney, Agent, or Firm* — Slater Matsil, LLP

(57) ABSTRACT

An embodiment system includes a walking assistance device configured to be worn by a user to assist walking of the user, an electric mobility device configured to be movable while being combined with the walking assistance device, and a server configured to receive movement information from the walking assistance device and the electric mobility device and to generate a control command for instructing the walking assistance device or the electric mobility device to move to a destination based on the movement information.

18 Claims, 7 Drawing Sheets

(58) Field of Classification Search
CPC ................. G06Q 50/22; G05D 1/0005; G05D 1/0011–0016; G05D 1/021–0212
See application file for complete search history.

(56) References Cited

U.S. PATENT DOCUMENTS

| | | | | |
|---|---|---|---|---|
| 10,732,638 | B2 | 8/2020 | Aiuchi et al. | |
| 11,148,279 | B1 * | 10/2021 | Mooney | B25J 9/0006 |
| 11,703,340 | B2 | 7/2023 | Baglino | |
| 11,786,425 | B2 * | 10/2023 | Villarreal Suarez | A61G 5/068 280/304.1 |
| 2010/0131139 | A1 | 5/2010 | Sakai | |
| 2018/0314263 | A1 | 11/2018 | Aiuchi et al. | |
| 2019/0282431 | A1 | 9/2019 | Moore | |
| 2021/0401644 | A1 | 12/2021 | Villarreal Suarez | |

FOREIGN PATENT DOCUMENTS

| | | | |
|---|---|---|---|
| JP | 2009089756 | A | 4/2009 |
| JP | 2010125868 | A | 6/2010 |
| JP | 2016005498 | A | 1/2016 |
| JP | 6566580 | B2 | 8/2019 |
| JP | 2019205819 | A | 12/2019 |
| JP | 2021025949 | A | 2/2021 |
| KR | 101299351 | B1 | 8/2013 |
| KR | 20160135753 | A | 11/2016 |
| KR | 20190109183 | A | 9/2019 |

* cited by examiner

| DEVICE INFORMATION | | | USER INFORMATION | | | | | AREA INFORMATION | | MOVEMENT INFORMATION | | |
|---|---|---|---|---|---|---|---|---|---|---|---|---|
| WALKING ASSISTANCE ROBOT (PRODUCT CODE) | ELECTRIC WHEELCHAIR (PRODUCT CODE) | DEVICE COMBINATION STATUS | User ID | HEIGHT (cm) | WEIGHT (Kg) | MOVEMENT HISTORY 1(y) -WALKING ASSISTANCE ROBOT- | MOVEMENT HISTORY 2(y) -ELECTRIC WHEELCHAIR- | MOVEMENT AREA | AREA CHARACTERISTICS | TIMESTAMP (start-end) | AVERAGE MOVING SPEED (km/h) | BATTERY REDUCED CAPACITY(%) |
| MEX1 | PWC1 | O | U1 | 179 | 85 | 3 | 5 | A | FLAT GROUND | 210810/09:05 210810/09:09 | 4 | 10 |
| MEX1 | PWC1 | X | U1 | 179 | 85 | 3 | 5 | B | STAIRS | 210810/09:10 210810/09:21 | 0.5 | 20 |
| MEX1 | PWC1 | O | U1 | 179 | 85 | 3 | 5 | C | FLAT GROUND | 210810/09:22 210810/09:24 | 5 | 10 |
| MEX1 | PWC1 | X | U1 | 179 | 85 | 3 | 5 | D | STAIRS | 210810/09:25 210810/09:35 | 1 | 25 |
| MEX1 | PWC1 | O | U2 | 160 | 70 | 2 | 2 | C | FLAT GROUND | 210810/09:20 210810/09:05 | 3 | 15 |
| MEX1 | PWC1 | X | U2 | 160 | 70 | 2 | 2 | D | STAIRS | 210810/09:27 210810/09:38 | 0.2 | 25 |
| MEX1 | PWC1 | O | U2 | 160 | 70 | 2 | 2 | E | DOWNHILL | 210810/09:40 210810/09:48 | 3 | 10 |
| MEX1 | PWC2 | O | U3 | 180 | 83 | 0.5 | 1.5 | C | FLAT GROUND | 210810/09:50 210810/10:04 | 3 | 15 |
| MEX1 | PWC2 | X | U3 | 180 | 83 | 0.5 | 1.5 | B | STAIRS | 210810/10:07 210810/10:35 | 0.1 | 30 |
| MEX1 | PWC2 | O | U3 | 180 | 83 | 0.5 | 1.5 | A | FLAT GROUND | 210810/10:37 210810/10:45 | 2 | 10 |
| MEX1 | PWC2 | O | U3 | 180 | 83 | 0.5 | 1.5 | F | UPHILL | 210810/10:46 210810/10:50 | 1 | 30 |

FIG.5

WALKING ASSISTANCE CONTROL SYSTEM AND METHOD

CROSS-REFERENCE TO RELATED APPLICATIONS

This application claims the benefit of Korean Patent Application No. 10-2022-0054403, filed on May 2, 2022, which application is hereby incorporated herein by reference.

TECHNICAL FIELD

The present disclosure relates to a walking assistance control system and method.

BACKGROUND

A walking assistance device may refer to a device that assists a user in walking, and an electric mobility device may refer to a device capable of moving the walking assistance device.

To effectively assist the user in walking, control for the electric mobility device needs to be performed while the user is wearing the walking assistance device. However, when the electric power of any one of the walking assistance device and the electric mobility device is insufficient, the control is impossible and thus the user's walking may not be easily aided. Accordingly, there is a need for a technology capable of securing the remaining battery capacity of the walking assistance device or the electric mobility device when moving to a destination.

SUMMARY

Embodiments of the present disclosure can solve problems occurring in the prior art while advantages achieved by the prior art are maintained intact.

An embodiment of the present disclosure provides a walking assistance control system and method capable of securing a remaining battery capacity of a walking assistance device or an electric mobility device, which is required for movement to a destination.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a walking assistance control system includes a walking assistance device worn by a user to assist walking of the user, an electric mobility device that is movable while being combined with the walking assistance device, and a server that receives movement information from the walking assistance device and the electric mobility device, and generates a control command for instructing one or more of the walking assistance device and the electric mobility device to move to a destination based on the movement information.

The server may calculate an average moving speed according to the movement information.

The server may calculate a battery reduced capacity based on the average moving speed according to the movement information.

The server may learn the battery reduced capacity corresponding to the movement information and the average moving speed, and predict the battery reduced capacity according to the learned information based on status information received in real time from the walking assistance device and the electric mobility device.

The server may determine whether the walking assistance device is able to move to a location where the walking assistance device is to be combined with the electric mobility device based on the calculated battery reduced capacity or the predicted battery reduced capacity.

The server may transmit a recommended route to the destination to the walking assistance device when it is determined that the walking assistance device is able to move to the location where the walking assistance device is to be combined with the electric mobility device.

The server may regenerate a route to the destination when it is determined that the walking assistance device is unable to move to the location where the walking assistance device is to be combined with the electric mobility device.

The server may determine whether one or more of the walking assistance device and the electric mobility device are able to move to the destination with a remaining battery capacity of the walking assistance device and a remaining battery capacity of the electric mobility device based on the calculated battery reduced capacity or the predicted battery reduced capacity when it is determined that the walking assistance device is combined with the electric mobility device.

The server may calculate a battery distribution capacity based on the calculated battery reduced capacity or the predicted battery reduced capacity when it is determined that one or more of the walking assistance device and the electric mobility device are unable to move to the destination with the remaining battery capacity of the walking assistance device and the remaining battery capacity of the electric mobility device.

The server may determine whether one or more of the walking assistance device and the electric mobility device are able to move to the destination with the calculated battery distribution capacity.

The server may transmit a command for controlling charging and discharging of a battery according to the battery distribution capacity to the walking assistance device and the electric mobility device when it is determined that one or more of the walking assistance device and the electric mobility device are able to move to the destination with the calculated battery distribution capacity.

The server may regenerate a route to the destination when it is determined that one or more of the walking assistance device and the electric mobility device are unable to move to the destination with the calculated battery distribution capacity.

The server may transmit a guidance message for instructing recombination with the electric mobility device securing a charged capacity to the walking assistance device when it is determined that one or more of the walking assistance device and the electric mobility device are unable to move to the destination with the calculated battery distribution capacity.

The server may transmit a message guiding a place where charging is possible to the walking assistance device or the electric mobility device when it is determined that one or more of the walking assistance device and the electric mobility device are unable to move to the destination with the calculated battery distribution capacity.

According to an embodiment of the present disclosure, a walking assistance control method includes receiving movement information from an electric mobility device that is movable while being combined with a walking assistance device, and generating a control command for instructing one or more of the walking assistance device and the electric mobility device to move to a destination based on the movement information.

The walking assistance control method may further include calculating an average moving speed according to the movement information, and calculating a battery reduced capacity based on the average moving speed according to the movement information.

The walking assistance control method may further include learning the battery reduced capacity corresponding to the movement information and the average moving speed, and predicting the battery reduced capacity according to the learned information based on status information received in real time from the walking assistance device and the electric mobility device.

The walking assistance control method may further include determining whether one or more of the walking assistance device and the electric mobility device are able to move to the destination with a remaining battery capacity of the walking assistance device and a remaining battery capacity of the electric mobility device based on the calculated battery reduced capacity or the predicted battery reduced capacity when it is determined that the walking assistance device is combined with the electric mobility device.

The walking assistance control method may further include calculating a battery distribution capacity based on the calculated battery reduced capacity or the predicted battery reduced capacity when it is determined that one or more of the walking assistance device and the electric mobility device are unable to move to the destination with the remaining battery capacity of the walking assistance device and the remaining battery capacity of the electric mobility device.

The walking assistance control method may further include regenerating a route to the destination when it is determined that one or more of the walking assistance device and the electric mobility device are unable to move to the destination with the calculated battery distribution capacity.

According to an embodiment of the present disclosure, a walking assistance device includes a communication device that receives movement information from an electric mobility device and a controller that generates one of a control command for instructing the walking assistance device to move to a destination based on the movement information and a control command for instructing the electric mobility device to move to the destination.

According to an embodiment of the present disclosure, an electric mobility device includes a communication device that receives movement information from a walking assistance device and a controller that generates one of a control command for instructing the electric mobility device to move to a destination based on the movement information and a control command for instructing the walking assistance device to move to the destination.

BRIEF DESCRIPTION OF THE DRAWINGS

The above and other objects, features and advantages of embodiments of the present disclosure will be more apparent from the following detailed description taken in conjunction with the accompanying drawings, in which:

FIG. 5 is a diagram illustrating movement history information stored in a server according to an embodiment of the present disclosure;

DETAILED DESCRIPTION OF ILLUSTRATIVE EMBODIMENTS

Figure 1:
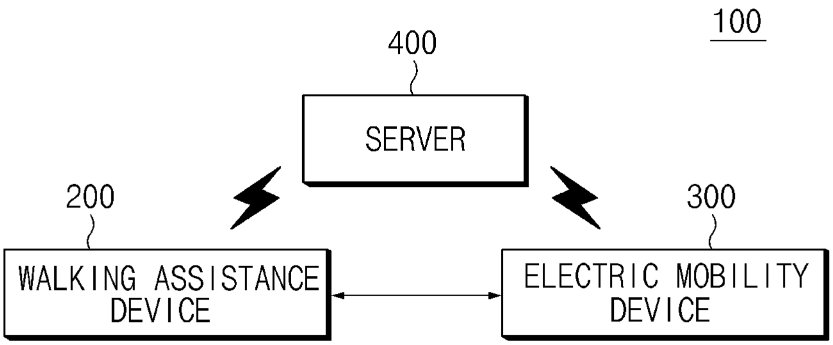
FIG. 1 is a diagram illustrating a configuration of a walking assistance control system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of well-known features or functions will be omitted in order not to unnecessarily obscure the gist of embodiments of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a diagram illustrating a configuration of a walking assistance control system according to an embodiment of the present disclosure.

Referring to FIG. 1, a walking assistance control system 100 according to an embodiment of the present disclosure may include a walking assistance device 200, an electric mobility device 300, and a server 400.

The walking assistance device 200 may be worn by a user and may assist the user in walking. According to another embodiment of the present disclosure, the walking assistance device 200 may be implemented in the form of a scooter that the user is able to ride, in addition to being worn by the user. That is, the walking assistance device 200 may be changed as long as it is a device that assists the user in walking. The walking assistance device 200 will be described in detail with reference to FIG. 2.

The electric mobility device 300 may be movable while being coupled to the walking assistance device 200. The electric mobility device 300 according to an embodiment of the present disclosure may refer to a movable device including the walking assistance device 200. As an example, the electric mobility device 300 may include an electric wheelchair that is able to move together with the walking assistance device, a delivery robot that moves the scooter, and the like. The electric mobility device 300 will be described in detail with reference to FIG. 3.

The server 400 may transmit a control command for enabling a user to move to a destination to the walking assistance device 200 or the electric mobility device 300. The server 400 may be implemented in the form of an application, and may be stored in a smart device (smart phone, smart pad, or computer) or the like. The server 400 will be described in detail with reference to FIG. 4.

Figure 2:
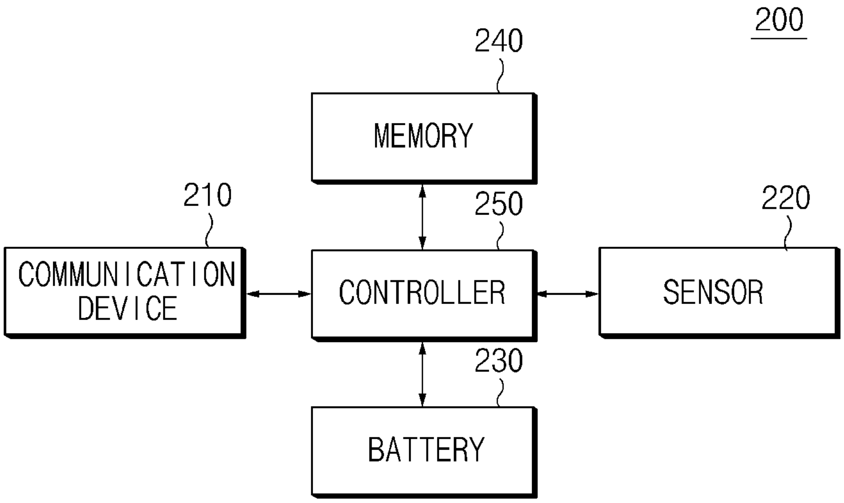
FIG. 2 is a diagram illustrating a configuration of a walking assistance device according to an embodiment of the present disclosure.

FIG. 2 is a diagram illustrating a configuration of a walking assistance device according to an embodiment of the present disclosure.

Referring to FIG. 2, the walking assistance device 200 may include a communication device 210, a sensor 220, a battery 230, a memory (i.e., a storage) 240, and a controller 250.

The communication device 210 may perform wireless communication with the server 400. The communication device 210 may communicate with the server 400 in various wireless communication methods including, for example, Wi-Fi, WiBro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), and Long Term Evolution (LTE). When the communication device 210 is unable to perform wireless communication with the server 400, the communication device 210 may communicate with the electric mobility device 300 by wire or wirelessly.

The sensor 220 may obtain movement information (status information). According to an embodiment, the movement information (status information) may include information obtained when the walking assistance device 200 moves, for example, user information (height, weight, device-specific movement history, or the like), movement area information to which the walking assistance device 200 has moved, a movement speed, and a remaining capacity of a battery. To this end, the sensor 220 may include an image sensor, a weight sensor, a speed sensor, a battery sensor, and the like. Here, the movement area information may include information indicating characteristics of the ground surface, such as flat ground, stairs, downhill, and uphill.

The battery 230 may provide power required for the operation of the walking assistance device 200. When the walking assistance device 200 is coupled to the electric mobility device 300, the battery 230 may be charged and discharged in a wired manner by being connected to the battery of the electric mobility device 300 through a charging cable, or in a wireless manner, according to the control command from the server 400.

The memory 240 may store at least one or more algorithms for performing operations or execution of various commands for the operation of the walking assistance device according to an embodiment of the present disclosure. Further, the memory 240 may store at least one or more algorithms for performing operations or execution of various commands to replace the operation of a server according to an embodiment of the present disclosure. The memory 240 may include at least one medium of a flash memory, a hard disk, a memory card, a Read-Only Memory (ROM), a Random Access Memory (RAM), an Electrically Erasable Programmable Read-Only Memory (EEPROM), a Programmable Read-Only Memory (PROM), a magnetic memory, a magnetic disk, and an optical disk. According to an embodiment of the present disclosure, the memory 240 may store the movement information (status information) received from the electric mobility device 300 in combination with each device information as movement history information by matching the movement information with each device information as shown in FIG. 5.

The controller 250 may be implemented by various processing devices such as a microprocessor incorporating a semiconductor chip capable of operating or executing various instructions or the like and may control an operation of the walking assistance device according to an embodiment of the present disclosure.

The controller 250 may transmit movement information (status information) obtained by the sensor 220 to the server 400. In addition, a part of the remaining capacity of the battery 230 may be transmitted to the electric mobility device 300 according to a control command received from the server 400 (control of the charging and discharging of the battery according to a battery distribution capacity) to charge the battery of the electric mobility device 300, and the battery 230 may be charged by receiving a part of the remaining capacity of the battery of the electric mobility device 300 from the electric mobility device 300.

Figure 4:
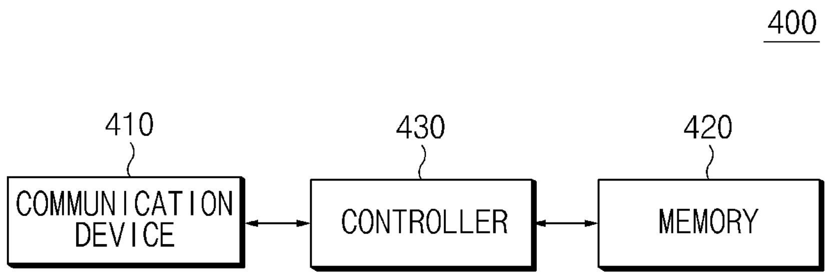
FIG. 4 is a diagram showing a configuration of a server according to an embodiment of the present disclosure.

According to another embodiment of the present disclosure, when wireless communication with the server 400 is hard, the controller 250 may perform the operation of the server in place of the server 400. The description of a controller 430 with reference to FIG. 4 is referred to for more detailed description. According to an embodiment, the controller 250 may calculate a battery distribution capacity based on information received from the electric mobility device 300 (information received from the electric mobility device by the server), and generate a distribution command based on the calculated battery distribution capacity.

Figure 3:
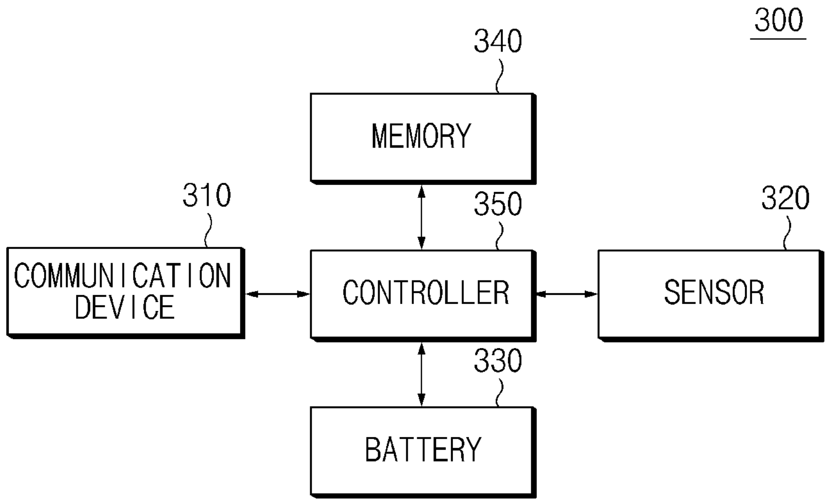
FIG. 3 is a diagram illustrating a configuration of an electric mobility device according to an embodiment of the present disclosure.

FIG. 3 is a diagram illustrating a configuration of an electric mobility device according to an embodiment of the present disclosure.

Referring to FIG. 3, the electric mobility device 300 may include a communication device 310, a sensor 320, a battery 330, a memory (i.e., a storage) 340, and a controller 350.

The communication device 310 may perform wireless communication with the server 400. The communication device 310 may communicate with the server 400 in various wireless communication methods including, for example, Wi-Fi, WiBro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), and Long Term Evolution (LTE). When the communication device 310 is unable to perform wireless communication with the server 400, the communication device 310 may communicate with the walking assistance device 200 by wire or wirelessly.

The sensor 320 may acquire movement information (status information). According to an embodiment, the movement information (status information) may include information obtained when the electric mobility device 300 moves, for example, user information (height, weight, device-specific movement history, or the like), movement area information to which the electric mobility device 300 has moved, a movement speed, and a remaining battery capacity. To this end, the sensor 320 may include an image sensor, a weight sensor, a speed sensor, a battery sensor, and the like. Here, the movement area information may include information indicating characteristics of the ground surface, such as flat ground, downhill, and uphill.

The battery 330 may provide power required for the operation of the electric mobility device 300. When the electric mobility device 300 is coupled to the walking assistance device 200, the battery 330 may be charged and discharged in a wired manner by being connected to the battery 230 of the walking assistance device 200 through a charging cable or in a wireless manner.

The memory 340 may store at least one or more algorithms for performing operations or execution of various commands for the operation of the electric mobility device according to an embodiment of the present disclosure. Further, the memory 340 may store at least one or more algorithms for performing operations or execution of various commands to replace the operation of a server according to an embodiment of the present disclosure. The memory 340 may include at least one medium of a flash memory, a hard disk, a memory card, a Read-Only Memory (ROM), a Random Access Memory (RAM), an Electrically Erasable Programmable Read-Only Memory (EEPROM), a Programmable Read-Only Memory (PROM), a magnetic memory, a magnetic disk, and an optical disk. According to an embodiment of the present disclosure, the memory 240 may store the movement information (status information) received from the electric mobility device 300 in combination with each device information as movement history information by matching the movement information with each device information as shown in FIG. 5.

The controller 350 may be implemented by various processing devices such as a microprocessor incorporating a semiconductor chip capable of operating or executing various instructions or the like and may control an operation of the electric mobility device according to an embodiment of the present disclosure.

The controller 350 may transmit movement information (status information) obtained by the sensor 320 to the server 400. In addition, a part of the remaining capacity of the battery 330 may be transmitted to the walking assistance device 200 according to a control command received from the server 400 (control of the charging and discharging of the battery according to a battery distribution capacity) to charge the battery 230, and the battery 330 may be charged by receiving a part of the remaining capacity of the battery 230 from the walking assistance device 200. According to another embodiment of the present disclosure, when wireless communication with the server 400 is hard, the controller 350 may perform the operation of the server in place of the server 400. The description of the controller 430 with reference to FIG. 4 is referred to for more detailed description. According to an embodiment, the controller 250 may calculate a battery distribution capacity based on information received from the walking assistance device 200 (information received from the walking assistance device 200 by the server), and generate a distribution command based on the calculated battery distribution capacity.

FIG. 4 is a diagram showing a configuration of a server according to an embodiment of the present disclosure.

Referring to FIG. 4, the server 400 may include a communication device 410, a memory (i.e., a storage) 420, and a controller 430.

The communication device 410 may perform wireless communication with the walking assistance device 200 and the electric mobility device 300. The communication device 410 may communicate with the walking assistance device 200 and the electric mobility device 300 in various wireless communication methods including, for example, Wi-Fi, WiBro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), and Long Term Evolution (LTE).

The memory 420 may store at least one or more algorithms for performing operations or execution of various commands for the operation of a server according to an embodiment of the present disclosure. The memory 420 may include at least one medium of a flash memory, a hard disk, a memory card, a Read-Only Memory (ROM), a Random Access Memory (RAM), an Electrically Erasable Programmable Read-Only Memory (EEPROM), a Programmable Read-Only Memory (PROM), a magnetic memory, a magnetic disk, and an optical disk. According to an embodiment of the present disclosure, the memory 420 may store the movement information (status information) received from the walking assistance device 200 and the electric mobility device 300 in combination with each device information as movement history information by matching the movement information with each device information as shown in FIG. 5.

FIG. 5 is a diagram illustrating movement history information stored in a server according to an embodiment of the present disclosure.

Referring to FIG. 5, the movement history information may include device information, user information, area information, and movement information. The controller 430 may calculate an average moving speed and a battery reduced capacity (used capacity) based on the received movement information, and the controller 430 may include the average moving speed and the battery reduced capacity in the movement information and store the average moving speed and the battery reduced capacity together in the memory 420.

Here, the average moving speed in the state in which the walking assistance device 200 and the electric mobility device 300 are combined may mean an average moving speed of the electric mobility device 300, and the average moving speed in the state in which the walking assistance device 200 and the electric mobility device 300 are not combined may mean an average moving speed of the walking assistance device 200.

In addition, the battery reduced capacity in the state in which the walking assistance device 200 and the electric mobility device 300 are combined may mean a battery reduced capacity of the electric mobility device 300, and the battery reduced capacity in the state in which the walking assistance device 200 and the electric mobility device 300 are not combined may mean a battery reduced capacity of the walking assistance device 200.

In addition, the memory 420 may store a map.

The controller 430 may be implemented by various processing devices such as a microprocessor incorporating a semiconductor chip capable of operating or executing various instructions or the like and may control an operation of the server according to an embodiment of the present disclosure.

The controller 430 may calculate an average moving speed according to the movement information for each device information (model) based on the movement information (e.g., movement area information, moving speed, and battery remaining capacity) received from the walking assistance device 200 and the electric mobility device 300. Also, the controller 430 may calculate a battery reduced capacity for each device information based on the average moving speed according to the movement information, and store the calculated average moving speed and the battery reduced capacity as movement history information.

The controller 430 may analyze the correlation relationship among the movement information, the average moving speed, and the battery reduced capacity, learn the battery reduced capacity corresponding to the movement information and the average moving speed, and predict the battery reduced capacity according to the learned information based on the status information received in real time from the walking assistance device 200 and the electric mobility device 300. The controller 430 may store the calculated battery reduced capacity and the predicted battery reduced capacity as movement history information in the memory 420.

The controller 430 may receive a destination and a current location. According to an embodiment, the controller 430 may receive destination information input through a user terminal, and receive location information of the user terminal and location information of the walking assistance device.

The controller 430 may generate a recommended route based on the destination and the current location. According to an embodiment, the recommended route generated by the controller 430 may include a route through which the walking assistance device 200 is able to move, and a route through which the walking assistance device 200 and the electric mobility device 300 are able to move in a combined state.

For example, when the electric mobility device 300 is located in the recommended route, the controller 430 may generate a route through which the walking assistance device 200 is able to move up to a location where the electric mobility device 300 is located, generate a route through which the walking assistance device 200 and the electric mobility device 300 are able to move, while being combined with each other, from the location where the electric mobility device 300 is located to a place to which the walking assistance device 200 only is able to move, and generate a route through which the walking assistance device 200 is able to move from the location to which the walking assistance device 200 only is able to move to a destination.

When the recommended route is generated, the controller 430 may receive device information (model name) from the walking assistance device 200 and receive the current remaining capacity of the battery. The controller 430 may determine whether movement is possible based on movement history information (a calculated battery reduced capacity or a predicted battery reduced capacity) previously stored corresponding to the device information and a current remaining capacity of the battery. According to an embodiment, the controller 430 may determine whether the walking assistance device 200 is able to move to a point where the walking assistance device 200 is combined with the electric mobility device 300. When it is determined that the walking assistance device 200 is unable to move to the point where the electric mobility device 300 is located due to the remaining battery capacity, the controller 430 may regenerate a route to the destination.

When it is determined that the walking assistance device 200 is able to move to the point where the electric mobility device 300 is located with the remaining battery capacity, the controller 430 may transmit a recommended route to the walking assistance device 200.

When the device information (model name) is received from the electric mobility device 300, the controller 430 may determine that the walking assistance device 200 and the electric mobility device 300 are combined.

The controller 430 may receive the remaining battery capacity from the walking assistance device 200 and the electric mobility device 300, and determine whether one or more of the walking assistance device 200 and the electric mobility device 300 are able to move to the destination along the recommended route based on the previously stored movement history information (the calculated battery reduced capacity or the predicted battery reduced capacity). Here, the controller 430 may periodically receive the remaining battery capacity from the walking assistance device 200 and the electric mobility device 300.

The controller 430 may calculate a battery distribution capacity based on the calculated battery reduced capacity or the predicted battery reduced capacity, when it is determined that one or more of the walking assistance device 200 and the electric mobility device 300 are unable to move to the destination along the recommended route based on the previously stored movement history information (the calculated battery reduced capacity or the predicted battery reduced capacity).

The controller 430 may determine whether one or more of the walking assistance device 200 and the electric mobility device 300 are able to move to a destination along the recommended route with the calculated battery distribution capacity.

When it is determined that one or more of the walking assistance device 200 and the electric mobility device 300 are able to move to a destination along the recommended route with the calculated battery distribution capacity, the controller 430 may generate a command for controlling charging and discharging (distribution of a charged capacity) of the battery according to the calculated battery distribution capacity, and transmit the command to the walking assistance device 200 and the electric mobility device 300.

When it is determined that one or more of the walking assistance device 200 and the electric mobility device 300 are unable to move to the destination along the recommended route based on the calculated battery distribution capacity, the controller 430 may regenerate the route to the destination. For example, the controller 430 may regenerate a route which minimizes battery consumption.

According to another embodiment, when it is determined that one or more of the walking assistance device 200 and the electric mobility device 300 are unable to move to the destination along the recommended route based on the calculated battery distribution capacity, the controller 430 may transmit a guidance message guiding recombination with the electric mobility device securing a charged capacity to the walking assistance device 200.

According to still another embodiment, when it is determined that one or more of the walking assistance device 200 and the electric mobility device 300 are unable to move to the destination along the recommended route based on the calculated battery distribution capacity, the controller 430 may transmit a message guiding a place where the walking assistance device 200 or the electric mobility device 300 is able to be charged to the walking assistance device 200 or the electric mobility device 300.

According to still another embodiment, when there are a plurality of walking assistance devices 200 in addition to the walking assistance device 200 which are about to move to the destination, the controller 430 may perform control to charge the walking assistance device 200 which is about to move to the destination using the plurality of walking assistance devices 200.

Figure 6:
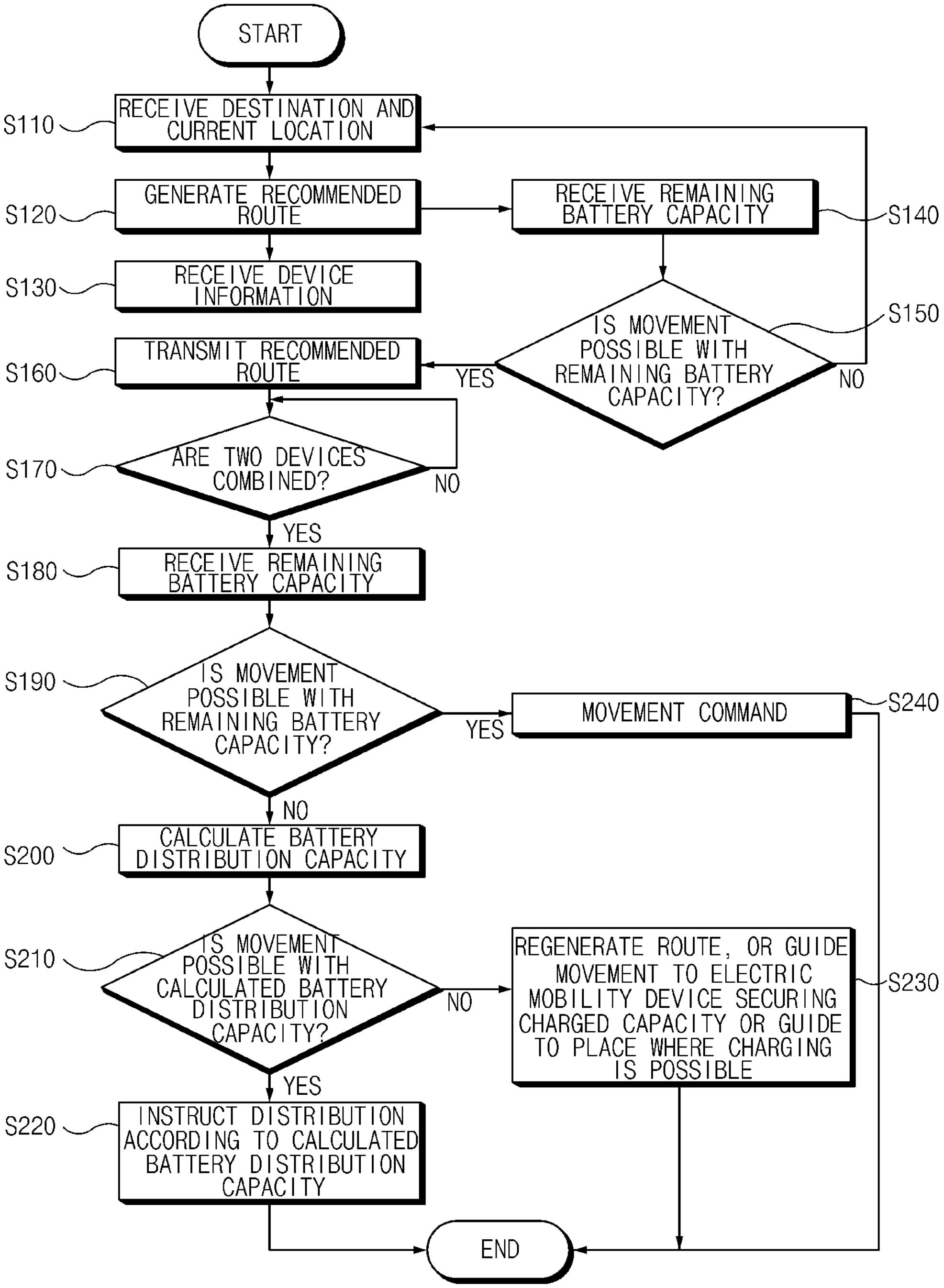
FIG. 6 is a diagram illustrating a walking assistance control method according to an embodiment of the present disclosure.

FIG. 6 is a diagram illustrating a walking assistance control method according to an embodiment of the present disclosure.

Referring to FIG. 6, the server 400 may receive a destination and a current location (S110). According to an embodiment, in S110, the server 400 may receive destination information input through a user terminal and receive location information of the user terminal and location information of the walking assistance device.

According to an embodiment, before S110, the server 400 may receive movement information (e.g., movement area information, moving speed, and battery remaining capacity) from the walking assistance device 200 and the electric mobility device 300 and calculate an average moving speed according to the movement information for each device information (model) based on the movement information. Also, the server 400 may calculate a battery reduced capacity for each device information based on the average moving speed according to the movement information and store the calculated average moving speed and the battery reduced capacity as movement history information.

The server 400 may analyze the correlation relationship among the movement information, the average moving speed, and the battery reduced capacity, learn the battery reduced capacity corresponding to the movement information and the average moving speed, and predict the battery reduced capacity according to the learned information based on the status information received in real time from the walking assistance device 200 and the electric mobility device 300. The server 400 may store the calculated battery reduced capacity and the predicted battery reduced capacity as movement history information in the memory 420.

The server 400 may generate a recommended route based on the destination and the current location (S120). According to an embodiment, in S120, the recommended route generated by the server 400 may include a route through which the walking assistance device 200 is able to move and a route through which the walking assistance device 200 and the electric mobility device 300 are able to move in a combined state.

For example, when the electric mobility device 300 is located in the recommended route, the controller 430 may generate a route through which the walking assistance device 200 is able to move up to a location where the electric mobility device 300 is located, generate a route through which the walking assistance device 200 and the electric mobility device 300 are able to move, while being combined with each other, from the location where the electric mobility device 300 is located to a location to which the walking assistance device 200 only is able to move, and generate a route through which the walking assistance device 200 is able to move from the location to which the walking assistance device 200 only is able to move to a destination.

When the recommended route is generated, the server 400 may receive device information (model name) from the walking assistance device 200 (S130) and receive the current remaining capacity of the battery (S140).

The server 400 may determine whether movement is possible based on movement history information (a calculated battery reduced capacity or a predicted battery reduced capacity) previously stored corresponding to the device information and a current remaining capacity of the battery (S150). According to an embodiment, the server 400 may determine whether the walking assistance device 200 is able to move to a point where the walking assistance device 200 is to be combined with the electric mobility device 300 (S150).

In S150, when the server 400 determines that the walking assistance device 200 is unable to move to the point where the electric mobility device 300 is located due to the remaining battery capacity (NO), the controller 430 may receive destination and current location information (S11) to regenerate a route to the destination (S120).

When it is determined in S150 that the walking assistance device 200 is able to move to the point where the electric mobility device 300 is located with the remaining battery capacity (YES), the server 400 may transmit a recommended route to the walking assistance device 200 (S160).

The server 400 may determine whether the walking assistance device 200 is combined with the electric mobility device 300 (S170). When the device information (model name) is received from the electric mobility device 300, in S170, the server 400 may determine that the walking assistance device 200 and the electric mobility device 300 are combined.

When it is determined in S170 that the walking assistance device 200 is combined with the electric mobility device 300 (YES), the server 400 may receive a remaining battery capacity from the walking assistance device 200 and the electric mobility device 300 (S180). In S180, the server 400 may periodically receive the remaining battery capacity from the walking assistance device 200 and the electric mobility device 300.

On the other hand, when it is determined in S170 that the walking assistance device 200 is not combined with the electric mobility device 300 (NO), the server 400 may re-determine whether the combination is made (S170).

The server 400 may determine whether one or more of the walking assistance device 200 and the electric mobility device 300 are able to move to the destination along the recommended route with the remaining battery capacity based on the previously stored movement history information (the calculated battery reduced capacity or the predicted battery reduced capacity) (S190).

When it is determined in S190 that one or more of the walking assistance device 200 and the electric mobility device 300 are unable to move to the destination along the recommended route based on the previously stored movement history information (the calculated battery reduced capacity or the predicted battery reduced capacity) (NO), the server 400 may calculate a battery distribution capacity based on the calculated battery reduced capacity or the predicted battery reduced capacity (S200).

When it is determined in S190 that one or more of the walking assistance device 200 and the electric mobility device 300 are able to move to the destination along the recommended route based on the previously stored movement history information (the calculated battery reduced capacity or the predicted battery reduced capacity) (YES), the server 400 may generate a movement command and transmit the movement command to the walking assistance device 200 and the electric mobility device 300 (S240).

When the battery distribution capacity is calculated in S200, the server 400 may determine whether one or more of the walking assistance device 200 and the electric mobility device 300 are able to move to a destination along the recommended route based on the calculated battery distribution capacity (S210).

When it is determined in S210 that one or more of the walking assistance device 200 and the electric mobility device 300 are able to move to a destination along the recommended route with the calculated battery distribution capacity (YES), the server 400 may generate a command for controlling charging and discharging (distribution of a charged capacity) of the battery according to the calculated battery distribution capacity and transmit the command to the walking assistance device 200 and the electric mobility device 300 (S220).

When it is determined in S210 that one or more of the walking assistance device 200 and the electric mobility device 300 are unable to move to the destination based on the calculated battery distribution capacity (NO), the server 400 may regenerate the route to the destination (S230). For example, the server 400 may regenerate a route which minimizes battery consumption.

According to another embodiment, when it is determined in S210 that one or more of the walking assistance device 200 and the electric mobility device 300 are unable to move to the destination based on the calculated battery distribution capacity (NO), in S230, the server 400 may transmit a guidance message for instructing recombination with the electric mobility device securing a charged capacity to the walking assistance device 200.

According to still another embodiment, when it is determined in S210 that one or more of the walking assistance device 200 and the electric mobility device 300 are unable to move to the destination based on the calculated battery distribution capacity (NO), in S230, the server 400 may transmit a message guiding to a place where the walking assistance device 200 or the electric mobility device 300 is able to be charged to the walking assistance device 200 or the electric mobility device 300.

According to still another embodiment, when it is determined in S210 that there are a plurality of walking assistance devices 200 in addition to the walking assistance device 200 which is about to move to the destination, in S230, the server 400 may perform control to charge the walking assistance device 200 which is about to move to the destination using the plurality of walking assistance devices 200.

Figure 7:
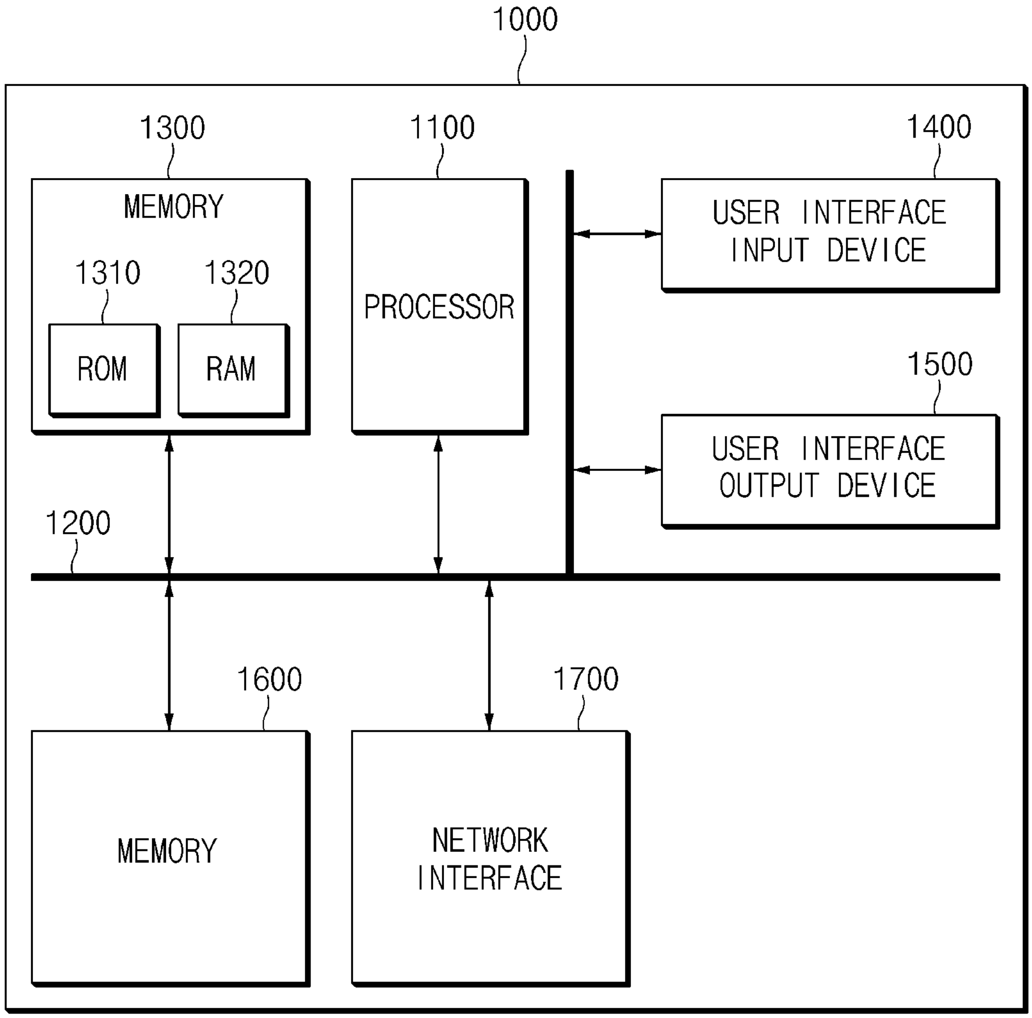
FIG. 7 a diagram showing a configuration of a computing system for executing a method according to an embodiment of the present disclosure.

FIG. 7 a diagram showing a configuration of a computing system for executing a method according to an embodiment of the present disclosure.

Referring to FIG. 7, a computing system 1000 may include at least one processor 1100, a memory 1300, a user interface input device 1400, a user interface output device 1500, a memory (i.e., a storage) 1600, and a network interface 1700, which are connected with each other via a bus 1200.

The processor 1100 may be a central processing unit (CPU) or a semiconductor device that processes instructions stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the memory 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The walking assistance control system and method according to the embodiments of the present disclosure secure the remaining battery capacities of the walking assistance device and the electric mobility device required when moving to a destination, thereby easily assisting the user in walking to the destination efficiently using the walking assistance device and the electric mobility device.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method comprising:

receiving movement information from an electric mobility device that is movable while being combined with a walking assistance device;

generating a recommended route to a destination, wherein the recommended route includes a route that the walking assistance device is able to move up to a location where the electric mobility device is located;

determining whether one or more of the walking assistance device and the electric mobility device are able to move to the destination along the recommended route; and based on determining that one or more of the walking assistance device and the electric mobility device are able to move to the destination along the recommended route, generating a control command for instructing one or more of the walking assistance device and the electric mobility device to move to the destination based on the movement information.

2. The method of claim 1, further comprising:

calculating an average moving speed according to the movement information; and calculating a battery reduced capacity based on the average moving speed according to the movement information.

3. The method of claim 2, further comprising:

learning information related to the battery reduced capacity corresponding to the movement information and the average moving speed; and predicting the battery reduced capacity according to the learned information based on status information received in real time from the walking assistance device and the electric mobility device.

4. The method of claim 3, further comprising:

determining whether the walking assistance device or the electric mobility device is able to move to the destination with a remaining battery capacity of the walking assistance device and the remaining battery capacity of the electric mobility device based on the calculated battery reduced capacity or the predicted battery reduced capacity when it is determined that the walking assistance device is combined with the electric mobility device.

5. The method of claim 4, further comprising:

calculating a battery distribution capacity based on the calculated battery reduced capacity or the predicted battery reduced capacity when it is determined that the walking assistance device or the electric mobility device is unable to move to the destination with the remaining battery capacity of the walking assistance device and the remaining battery capacity of the electric mobility device.

6. The method of claim 5, further comprising:

regenerating the route to the destination when it is determined that the walking assistance device or the electric mobility device is unable to move to the destination with the calculated battery distribution capacity.

7. A method comprising:

receiving movement information from an electric mobility device that is movable while being combined with a walking assistance device;

generating a control command for instructing the walking assistance device or the electric mobility device to move to a destination based on the movement information;

generating a recommended route based on the destination, wherein the recommended route includes a route between the walking assistance device and a location where the electric mobility device is located; and transmitting, to the walking assistance device, a guidance message for instructing recombination with the electric mobility device when it is determined that one or more of the walking assistance device and the electric mobility device are unable to move to the destination with a calculated battery distribution capacity.

8. The method of claim 7, further comprising:

calculating an average moving speed according to the movement information; and calculating a battery reduced capacity based on the average moving speed according to the movement information.

9. The method of claim 8, further comprising:

learning information related to the battery reduced capacity corresponding to the movement information and the average moving speed; and predicting the battery reduced capacity according to the learned information based on status information received in real time from the walking assistance device and the electric mobility device.

10. The method of claim 7, further comprising:

receiving movement history information from the walking assistance device and the electric mobility device, wherein the movement history information includes at least one of user information, area information, and movement information.

11. The method of claim 10, further comprising:

receiving device information from the electric mobility device; and determining whether the walking assistance device is combined with the electric mobility device based on the received device information.

12. The method of claim 7, wherein the guidance message includes guidance for directing the walking assistance device to a location where charging is possible.

13. A method comprising:

receiving movement information from an electric mobility device that is movable while being combined with a walking assistance device;

generating a control command for instructing the walking assistance device or the electric mobility device to move to a destination based on the movement information;

generating a recommended route based on the destination; and regenerating the recommended route to the destination when it is determined that the walking assistance device or the electric mobility device is unable to move to the destination with a calculated battery distribution capacity.

14. The method of claim 13, wherein the recommended route includes a route through which only the walking assistance device is able to move from its location to the destination.

15. The method of claim 13, wherein the recommended route includes a route through which the walking assistance device and the electric mobility device are able to move in a combined state.

16. The method of claim 13, further comprising:

calculating an average moving speed according to the movement information; and calculating a battery reduced capacity based on the average moving speed according to the movement information.

17. The method of claim 16, further comprising:

learning information related to the battery reduced capacity corresponding to the movement information and the average moving speed; and predicting the battery reduced capacity according to the learned information based on status information received in real time from the walking assistance device and the electric mobility device.

18. The method of claim 17, further comprising:

determining whether the walking assistance device or the electric mobility device is able to move to the destination with a remaining battery capacity of the walking assistance device and the remaining battery capacity of the electric mobility device based on the calculated battery reduced capacity or the predicted battery reduced capacity when it is determined that the walking assistance device is combined with the electric mobility device.

* * * * *